(12) United States Patent
Dimou et al.

(10) Patent No.: US 9,775,067 B2
(45) Date of Patent: Sep. 26, 2017

(54) INTERCELL INTERFERENCE COORDINATION FOR RADIO RESOURCE CONTROL

(75) Inventors: Konstantinos Dimou, Stockholm (SE); Gabor Fodor, Hässelby (SE); Anders Furuskär, Stockholm (SE); Walter Müller, Upplands Väsby (SE); Arne Simonsson, Gammelstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 795 days.

(21) Appl. No.: 13/124,955

(22) PCT Filed: Oct. 20, 2008

(86) PCT No.: PCT/SE2008/051178
§ 371 (c)(1),
(2), (4) Date: Apr. 19, 2011

(87) PCT Pub. No.: WO2010/047627
PCT Pub. Date: Apr. 29, 2010

(65) Prior Publication Data
US 2011/0230200 A1    Sep. 22, 2011

(51) Int. Cl.
*H04W 28/00* (2009.01)
*H04W 72/04* (2009.01)

(52) U.S. Cl.
CPC ............ *H04W 28/00* (2013.01); *H04W 72/04* (2013.01)

(58) Field of Classification Search
CPC ..... H04W 28/00; H04W 28/04; H04W 72/04; H04W 72/0486; H04W 72/08; H04W 72/082; H04W 72/085

USPC ................ 455/63.1–63.3, 114.2–114.3, 296, 455/445–452.2, 509; 370/431–463, 329, 370/341, 348, 395.4
See application file for complete search history.

(56) References Cited

U.S. PATENT DOCUMENTS

| | | | | |
|---|---|---|---|---|
| 8,442,069 | B2* | 5/2013 | Ji | H04W 72/082 370/208 |
| 2006/0120302 | A1* | 6/2006 | Poncini | H04W 24/00 370/254 |
| 2006/0121854 | A1* | 6/2006 | Abhishek | H04W 16/10 455/63.1 |
| 2006/0142020 | A1* | 6/2006 | Mueckenheim | H04W 72/0486 455/453 |
| 2007/0042784 | A1* | 2/2007 | Anderson | H04W 52/34 455/450 |

(Continued)

FOREIGN PATENT DOCUMENTS

| | | |
|---|---|---|
| WO | 2006/027010 A1 | 3/2006 |
| WO | 2006/077141 A1 | 7/2006 |
| WO | 2008/120159 A2 | 10/2008 |

*Primary Examiner* — Marcus Hammonds
(74) *Attorney, Agent, or Firm* — Coats & Bennett, PLLC

(57) ABSTRACT

A system includes a first device (110) to classify data as one of a control message or a non-control message, and provide the classification of the data to a second device (122). The second device (122) receives the classification of the data, receives information associated with a resource (460), calculates an expected interference associated with the resource (460) based on the information associated with the resource (460), and allocates, to the resource (460), data classified as a control message when the expected interference corresponds to a low expected interference.

14 Claims, 11 Drawing Sheets

(56) References Cited

U.S. PATENT DOCUMENTS

2007/0167191 A1* 7/2007 Carlsson ............... H04W 16/10
　　　　　　　　　　　　　　　　　　　　　　　　455/562.1
2008/0268833 A1* 10/2008 Huang ................... H04B 7/024
　　　　　　　　　　　　　　　　　　　　　　　　455/425

* cited by examiner

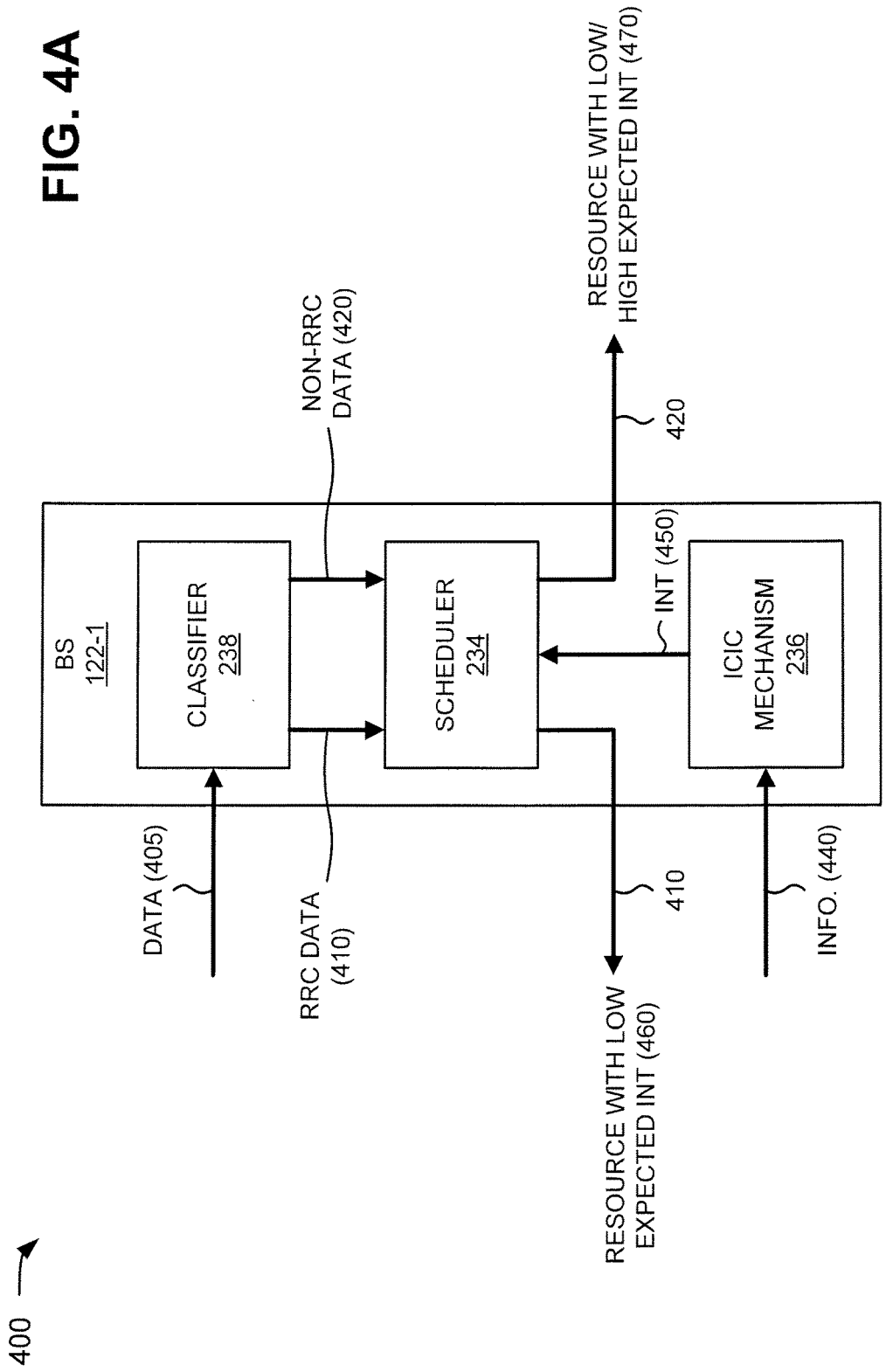

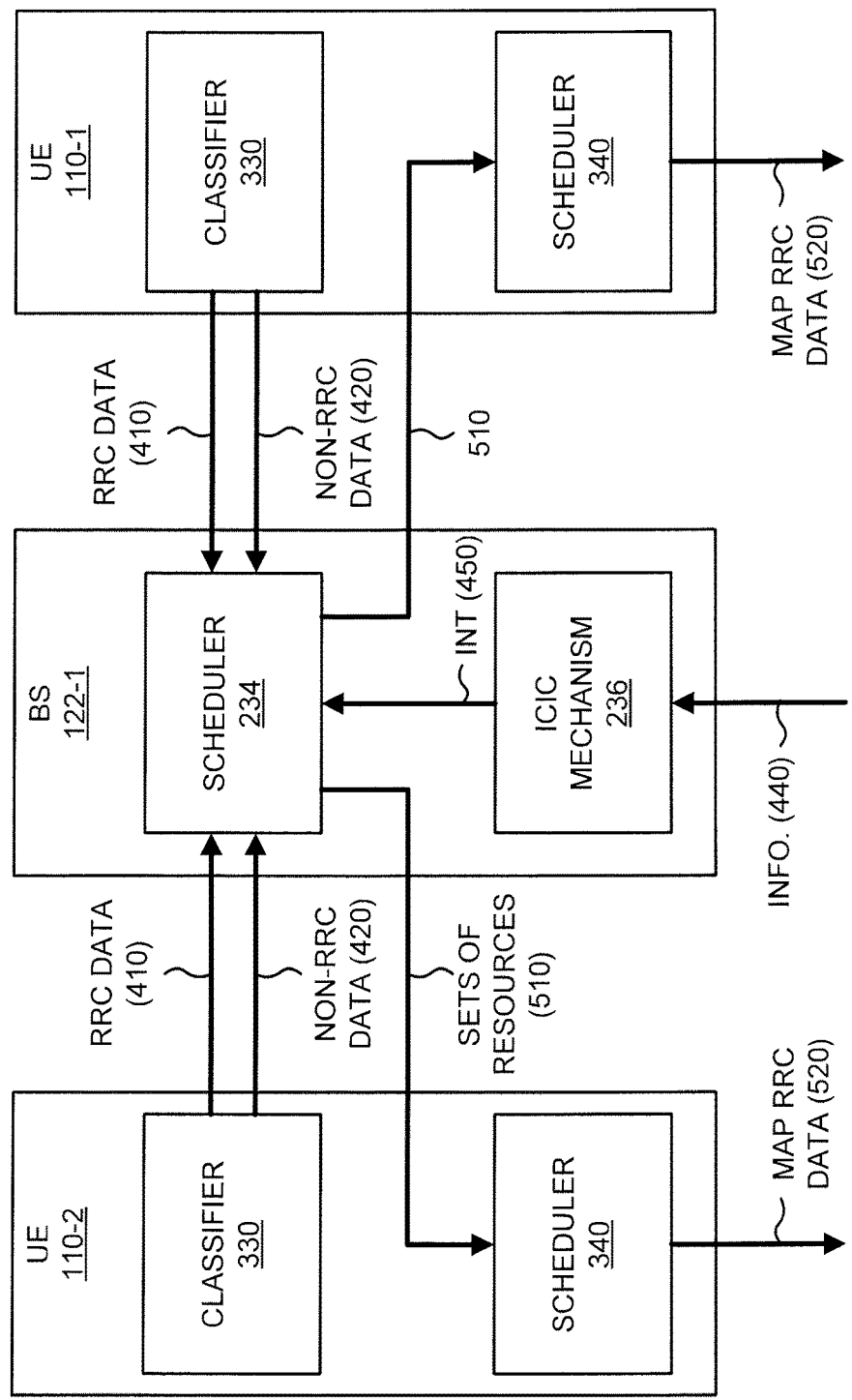

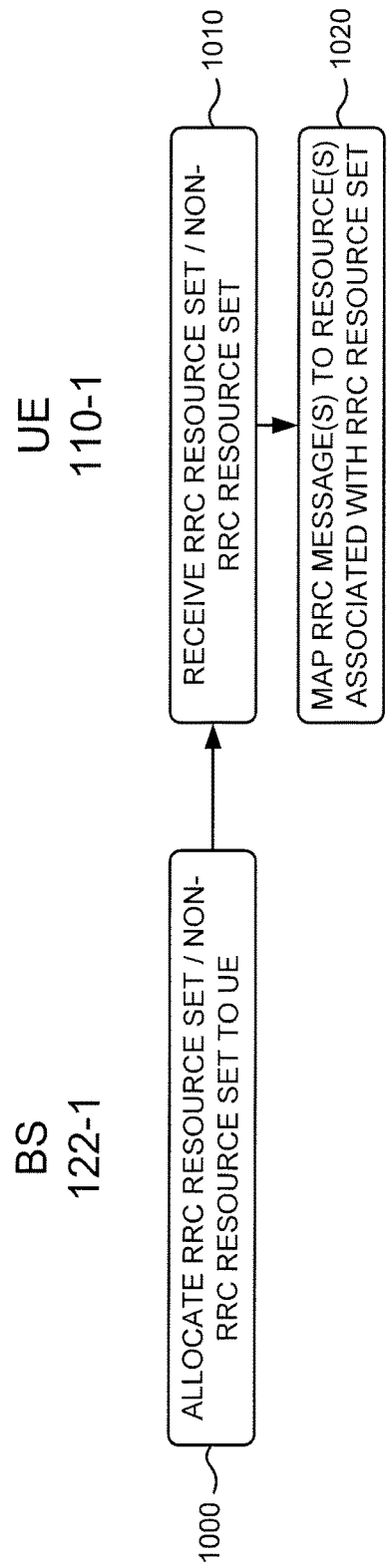

INTERCELL INTERFERENCE COORDINATION FOR RADIO RESOURCE CONTROL

TECHNICAL FIELD

Embodiments described herein relate generally to wireless communication systems, and more particularly, to intercell interference coordination for radio resource control.

BACKGROUND

Intercell interference occurs when signals transmitted in neighboring cells interfere with signals transmitted in a particular cell. Handling intercell interference at a cell border area may be beneficial for existing as well as future communication systems in order to guarantee efficient use of available bandwidth. Intercell interference coordination (ICIC) aims at reducing the level of interference and/or mitigating the impact of interference generated by cells that neighbor a particular cell while maintaining quality in the particular cell. Some ICIC techniques include power control, fractional loading, frequency reuse, and dynamic channel allocation. For example, in Global System for Mobile communications (GSM), some systems operate a broadcast channel (BCH) carrier in a certain frequency band with a frequency reuse larger than a frequency reuse provided for other carriers (e.g., a reuse factor of "12" compared to a reuse factor of "3").

Many ICIC solutions result in resource allocations with improved and stabilized channel quality (e.g., signal-to-interference ratio) at the expense of more narrow allocations (e.g., smaller bandwidth). Whether the combined effect of these ICIC solutions is beneficial depends on characteristics of the services to be carried by the network.

An example of a service with limited bandwidth usage is Radio Resource Control (RRC). The RRC protocol is used in the control plane of the Third Generation (3G) and Beyond 3G (B3G) wireless stacks. RRC belongs to the Universal Mobile Telecommunications System (UMTS) Wideband Code Division Multiple Access (WCDMA) protocol stack and to the 3GPP Long Term Evolution (LTE) protocol stack, and handles control plane signaling of Layer 3 between user equipment (UE) and a UMTS Terrestrial Radio Access Network (UTRAN) and the Evolved UTRAN (E-UTRAN). RRC performs functions for connection establishment and release, broadcast of system information, Radio Bearer establishment/reconfiguration and releases, RRC Connection mobility procedures, paging notification and release, outer loop power control, etc. RRC messages are of limited size, but have stringent delay requirements. For the Long Term Evolution (LTE) project (a project within the Third Generation Partnership Project (3GPP) to improve the UMTS mobile phone standard), RRC messages are transmitted using downlink and uplink traffic channels (TCH), and are also interfered with by TCHs from other cells.

To improve robustness of RRC messages, some systems prioritize RRC messages in schedulers in order to reduce the queuing delay associated with RRC messages. Other systems apply an extra robust modulation and coding for RRC messages. This may reduce a number of retransmissions for RRC messages, and delay associated with RRC messages. However, none of these systems control interference associated specifically with RRC messages. The GSM system controls interference associated with the BCH carrier (not RRC messages), and at the expense of a separate frequency band for the BCH carrier.

Furthermore, it is not trivial to determine, at an ICIC level, how and/or which channels or resources carry a RRC message. Additionally, the RRC message may require a better ICIC level than the ICIC level required for user data.

SUMMARY

It is an object of the invention to overcome at least some of the above disadvantages and to apply intercell interference coordination mechanisms to Radio Resource Control (RRC) messages.

Embodiments described herein may apply intercell interference coordination mechanisms to control messages (e.g., Radio Resource Control (RRC) messages) in a system where RRC messages and user data are carried by the same traffic channels (TCHs). In one embodiment, for example, user equipment (UE) may receive data for transmission, may classify the data as a RRC message or a non-RRC message, and may provide the data classification to a base station (BS). The base station may receive the data classification, may collect information associated with resources, and may calculate expected interferences for the resources based on the collected information. The base station may allocate data classified as a RRC message to a resource with a low expected interference. The user equipment may receive the data classified as a RRC message via the resource with the low expected interference.

In an exemplary embodiment, the base station may calculate the expected interferences for the resources using a fractional load intercell interference coordination (ICIC) mechanism or a frequency reuse ICIC mechanism.

In another exemplary embodiment, the base station may allocate a RRC resource set and a non-RRC resource set to the user equipment, and the user equipment may receive information identifying the RRC resource set and the non-RRC resource set. The user equipment may map one or more RRC messages to resources associated with the RRC resource set.

Such an arrangement may ensure that RRC messages are allocated to resources with low expected intercell interferences, and may provide improved robustness for RRC messages. More robust RRC messages may provide more robust control signaling, which may lead to more robust handovers, connection set-ups, etc.

BRIEF DESCRIPTION OF THE DRAWINGS

FIG. 4A illustrates a diagram of exemplary operation of the base station depicted in FIG. 1;

FIG. 5 illustrates another diagram of exemplary interactions among the base station and the user equipment depicted in FIG. 1;

FIGS. 8-10 depict flow charts of an exemplary process according to embodiments described herein.

DETAILED DESCRIPTION

The following detailed description refers to the accompanying drawings. The same reference numbers in different drawings may identify the same or similar elements. Also, the following detailed description does not limit the invention.

Embodiments described herein may apply intercell interference coordination mechanisms to Radio Resource Control (RRC) messages in a system where RRC messages and user data are carried by the same set of traffic channels (TCHs). The set of traffic channels may, in some systems, include a scheduled shared channel, such as a LTE Physical Uplink Shared Channel (PUSCH), and a LTE Physical Downlink Shared Channel (PDSCH). The embodiments described herein may apply to control messages (other than RRC) that are carried on the same shared channel as user data.

Figure 1:
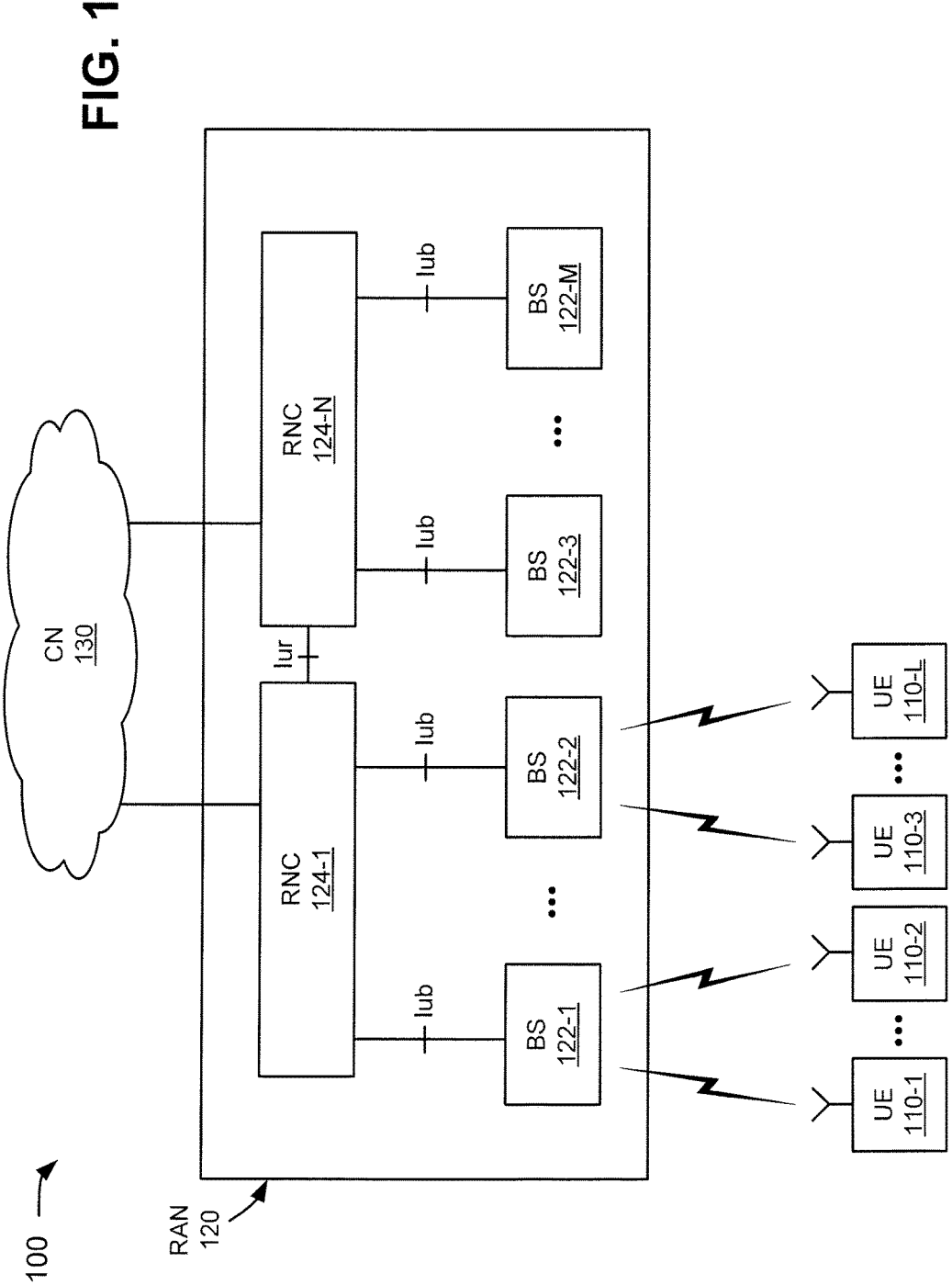
FIG. 1 depicts a diagram of an exemplary network in which systems and/or methods described herein may be implemented.

FIG. 1 depicts a diagram of an exemplary network 100 in which systems and/or methods described herein may be implemented. As shown, network 100 may include a group of user equipment (UE) 110-1 through 110-L (referred to collectively, and in some instances individually, as "user equipment 110"), a radio access network (RAN) 120, and a core network (CN) 130. Four pieces of user equipment, a single radio access network, and a single core network have been illustrated in FIG. 1 for simplicity. In practice, there may be more UEs, random access networks, and/or core networks. Also, in some instances, a component in network 100 (e.g., one or more of user equipment 110, radio access network 120, and core network 130) may perform one or more functions described as being performed by another component or group of components in network 100.

User equipment 110 may include one or more devices capable of sending/receiving voice and/or data to/from radio access network 120. In one embodiment, user equipment 110 may include, for example, a wireless telephone, a personal digital assistant (PDA), a laptop computer, etc.

Radio access network 120 may include one or more devices for transmitting voice and/or data to user equipment 110 and core network 130. As illustrated, radio access network 120 may include a group of base stations (BSs) 122-1 through 122-M (referred to collectively as "base stations 122" and in some instances, individually as "base station 122") and a group of radio network controllers (RNCs) 124-1 through 124-N (referred to collectively as "radio network controllers 124" and in some instances, individually as "radio network controller 124"). Four base stations 122 and two radio network controllers 124 are shown in FIG. 1 for simplicity. In practice, there may be more or fewer base stations and/or radio network controllers. Also, in some instances, a component in radio access network 120 (e.g., one or more of base stations 122 and radio network controllers 124) may perform one or more functions described as being performed by another component or group of components in radio access network 120.

Base stations 122 (also referred to as "Node Bs") may include one or more devices that receive voice and/or data from radio network controllers 124 and transmit that voice and/or data to user equipment 110 via an air interface. Base stations 122 may also include one or more devices that receive voice and/or data from user equipment 110 over an air interface and transmit that voice and/or data to radio network controllers 124 or other user equipment 110.

Radio network controllers 124 may include one or more devices that control and manage base stations 122. Radio network controllers 124 may also include devices that perform data processing to manage utilization of radio network services. Radio network controllers 124 may transmit/receive voice and data to/from base stations 122, other radio network controllers 124, and/or core network 130.

A radio network controller 124 may act as a controlling radio network controller (CRNC), a drift radio network controller (DRNC), or a serving radio network controller (SRNC). A CRNC may be responsible for controlling the resources of a base station 122. On the other hand, an SRNC may serve particular user equipment 110 and may manage connections towards that user equipment 110. Likewise, a DRNC may fulfill a similar role to the SRNC (e.g., may route traffic between a SRNC and particular user equipment 110).

As illustrated in FIG. 1, a radio network controller 124 may connect to a base station 122 via an Iub interface and to another radio network controller 124 via an Iur interface.

Core network 130 may include one or more devices that transfer/receive voice and/or data to a circuit-switched and/or packet-switched network. In one embodiment, core network 130 may include, for example, a Mobile Switching Center (MSC), a Gateway MSC (GMSC), a Media Gateway (MGW), a Serving General Packet Radio Service (GPRS) Support Node (SGSN), a Gateway GPRS Support Node (GGSN), and/or other devices.

Figure 2:
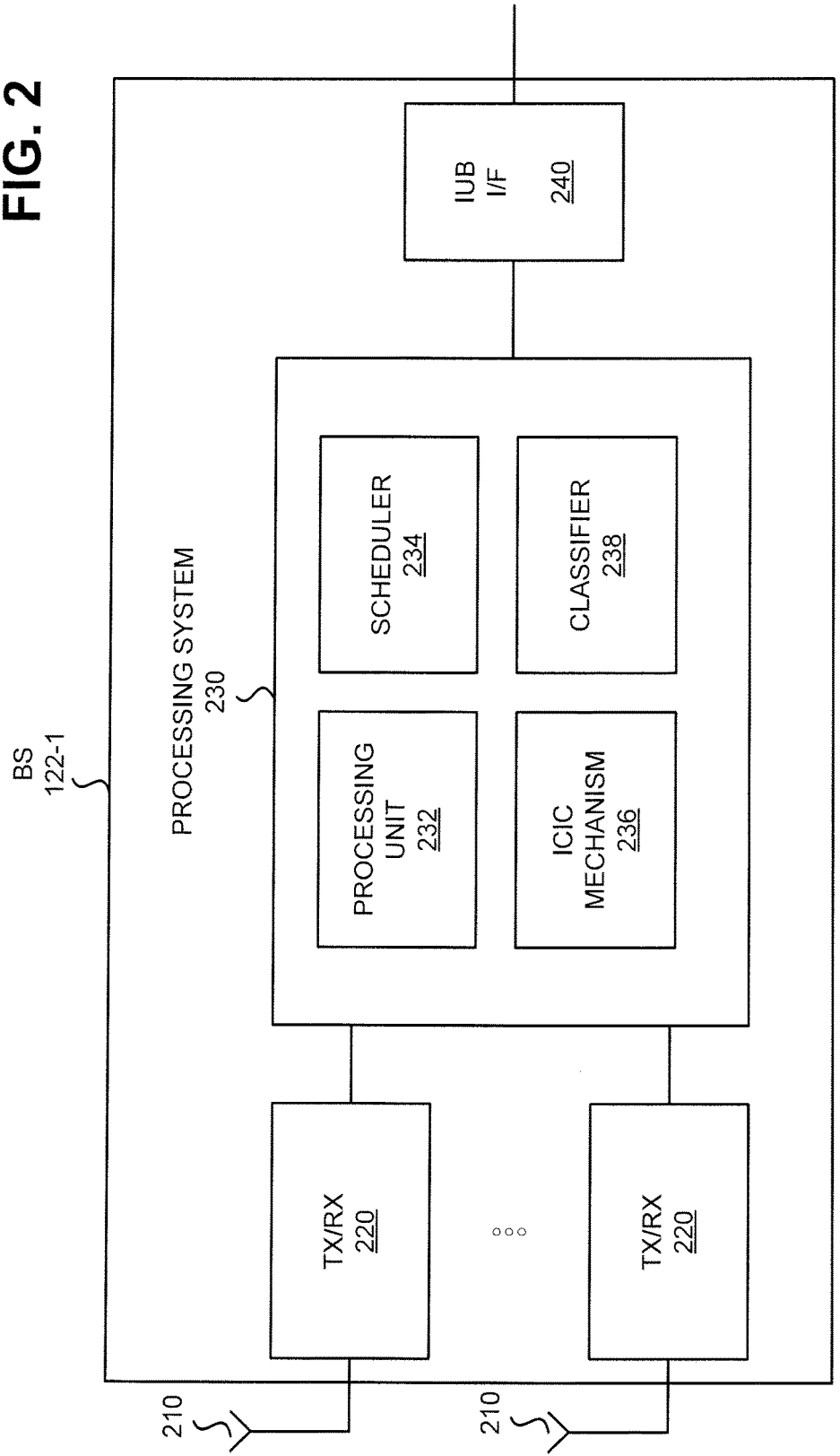
FIG. 2 illustrates a diagram of exemplary components of a base station depicted FIG. 1.

FIG. 2 illustrates a diagram of exemplary components of base station 122-1. Base stations 122-2 through 122-M may be similarly configured. As shown in FIG. 2, base station 122-1 may include antennas 210, transceivers (TX/RX) 220, a processing system 230, and Iub interface (I/F) 240.

Antennas 210 may include one or more directional and/or omni-directional antennas. Transceivers 220 may be associated with antennas 210 and may include transceiver circuitry for transmitting and/or receiving symbol sequences in a network, such as network 110, via antennas 210.

Processing system 230 may control the operation of base station 122-1. Processing system 230 may also process information received via transceivers 220 and Iub interface 240. Processing system 230 may further measure quality and strength of connection, may determine the frame error rate (FER), and may transmit this information to radio network controller 124-1. As illustrated, processing system 230 may include a processing unit 232, a scheduler 234, an intercell interference coordination (ICIC) mechanism 236, and a classifier 238.

Processing unit 232 may include a processor, a microprocessor, an application specific integrated circuit (ASIC), a field programmable gate array (FPGA), or the like. Processing unit 232 may process information received via transceivers 220 and Iub interface 240. The processing may include, for example, data conversion, forward error correction (FEC), rate adaptation, Wideband Code Division Multiple Access (WCDMA) spreading/dispreading, quadrature phase shift keying (QPSK) modulation, etc. In addition, processing unit 232 may generate control messages and/or data messages (e.g., HS-DSCH DATA FRAMES) and may cause those control messages and/or data messages to be transmitted via transceivers 220 and/or Iub interface 240.

Processing unit 232 may also process control messages and/or data messages received from transceivers 220 and/or Iub interface 240.

Scheduler 234 may include hardware, software, or a combination of hardware and software that maps blocks of data to one or more resources (e.g., a traffic channel, a radio bearer, a scheduled shared channel (e.g., a Physical Uplink Shared Channel (PUSCH), a Physical Downlink Shared Channel (PDSCH), etc.), etc. associated with network 100). For example, in one embodiment, scheduler 234 may receive classified data (e.g., data classified as RRC data and/or non-RRC data) from classifier 238, and may receive, from ICIC mechanism 236, expected intercell interference information associated with the one or more resources. Scheduler 234 may map (or allocate) the RRC data to a resource with low expected intercell interference, and may map (or allocate) the non-RRC data to a resource with low and/or high expected intercell interference. In another embodiment, scheduler 234 may utilize the received information (e.g., the RRC data, the non-RRC data, and/or the expected intercell interference information) to determine one or more resources with a low expected intercell interference and/or one or more resources with low and/or high expected intercell interference. Scheduler 234 may output the determined information and/or may utilize the determined information when allocating data (e.g., the RRC data or the non-RRC data) to one or more resources. For example, scheduler 234 may allocate the RRC data to the one or more resources with low expected intercell interference, and may allocate the non-RRC data to the one or more resources with low and/or high expected intercell interference. In other embodiments, scheduler 234 may allocate a RRC resource set and a non-RRC resource set to user equipment 110. User equipment 110 may receive information identifying the RRC resource set and the non-RRC resource set, and may map (or allocate) one or more RRC messages to one or more resources associated with the RRC resource set.

ICIC mechanism 236 may include hardware, software, or a combination of hardware and software that receives information associated with one or more resources (e.g., of network 100), and calculates the expected intercell interference information associated with the one or more resources. In one embodiment, for example, an expected intercell interference of a particular resource may be functionally related to properties of the particular resource. ICIC mechanism 236 may provide the expected intercell interference information to scheduler 234. ICIC mechanism 236 may include a variety of intercell interference coordination mechanisms, such as, for example, a fractional load ICIC mechanism, a frequency reuse ICIC mechanism, etc.

Classifier 238 may include hardware, software, or a combination of hardware and software that receives data (e.g., from network 100), and classifies the data as RRC data or non-RRC data. In one example, if particular data is provided via the RRC protocol, classifier 238 may determine the particular data to be RRC data. In one example, the classification may be performed based on a header of data packets. In some systems, the RRC protocol may be originated and/or terminated within base station 122-1, and the classification may be received from the radio resource signaling unit. Classifier 238 may provide the data classified as RRC data and/or non-RRC data to scheduler 234.

Iub interface 240 may include one or more line cards that allow base station 122-1 to transmit data to and receive data from radio network controller 124-1.

As described herein, base station 122-1 may perform certain operations in response to processing system 230 executing software instructions of an application contained in a computer-readable medium (e.g., such as a memory associated with base station 122-1). A computer-readable medium may be defined as a physical or logical memory device. The software instructions may be read into memory from another computer-readable medium or from another device via antennas 210 and transceivers 220. The software instructions contained in memory may cause processing system 230 to perform processes described herein. Alternatively, hardwired circuitry may be used in place of or in combination with software instructions to implement processes described herein. Thus, embodiments described herein are not limited to any specific combination of hardware circuitry and software.

Although FIG. 2 shows exemplary components of base station 122-1, in other embodiments, base station 122-1 may contain fewer, different, or additional components than depicted in FIG. 2. In still other embodiments, one or more components of base station 122-1 may perform one or more other tasks described as being performed by one or more other components of base station 122-1.

Figure 3:
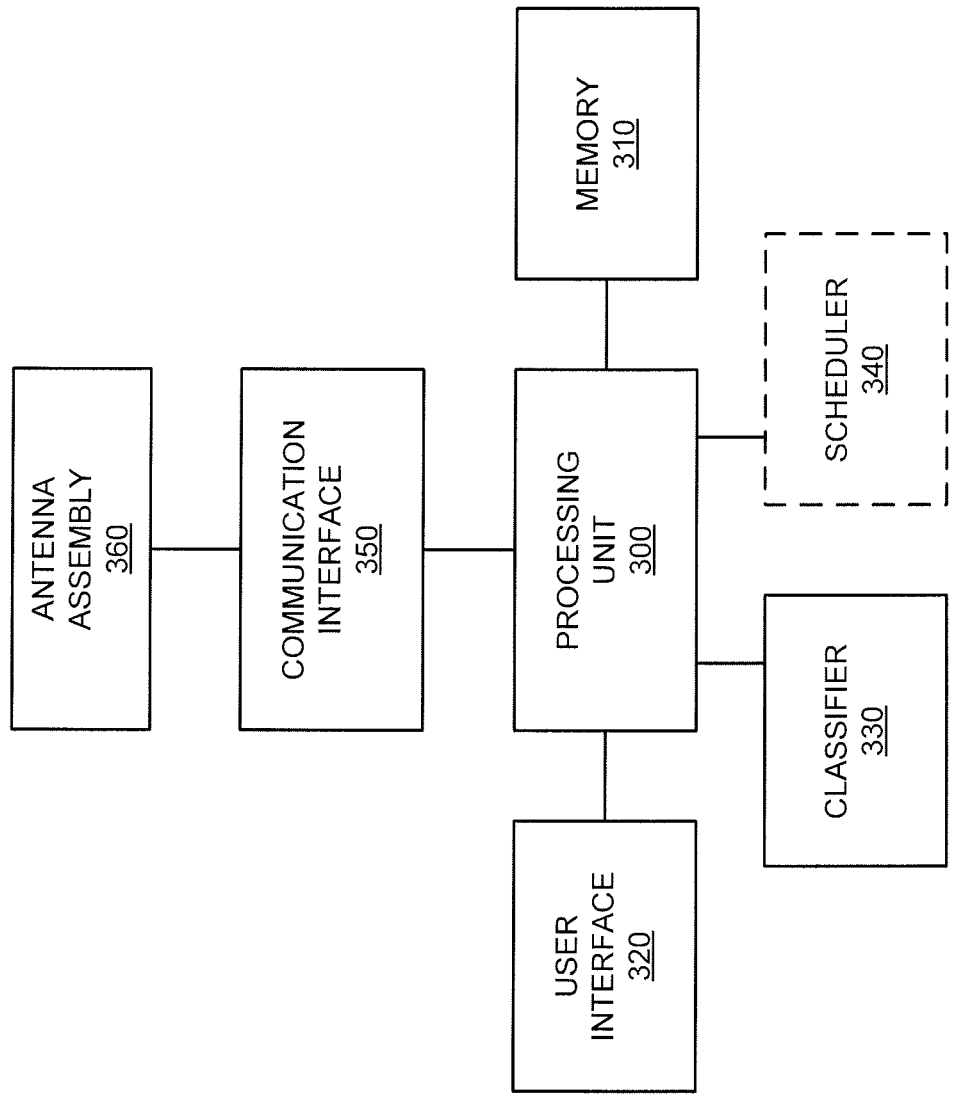
FIG. 3 depicts a diagram of exemplary components of user equipment illustrated in FIG. 1.

FIG. 3 depicts a diagram of exemplary components of user equipment 110-1. User equipment 110-2 through 110-L may be similarly configured. As shown in FIG. 3, user equipment 110-1 may include a processing unit 300, a memory 310, a user interface 320, a classifier 330, a scheduler 340 (optional), a communication interface 350, and/or an antenna assembly 360.

Processing unit 300 may include a processor, a microprocessor, an ASIC, a FPGA, or the like. Processing unit 240 may control operation of user equipment 110-1 and its components. In one embodiment, processing unit 300 may control operation of components of user equipment 110-1 in a manner described herein.

Memory 310 may include a random access memory (RAM), a read-only memory (ROM), and/or another type of memory to store data and instructions that may be used by processing unit 300.

User interface 320 may include mechanisms for inputting information to user equipment 110-1 and/or for outputting information from user equipment 110-1.

Classifier 330 may include hardware, software, or a combination of hardware and software that receives data (e.g., from network 100), and classifies the data as RRC data or non-RRC data. Classifier 330 may provide the data classified as RRC data and/or non-RRC data to scheduler 234 (of base station 122-1).

Scheduler 340 may include hardware, software, or a combination of hardware and software that maps blocks of data to one or more resources (e.g., a traffic channel, a radio bearer, a scheduled shared channel (e.g., a Physical Uplink Shared Channel (PUSCH), a Physical Downlink Shared Channel (PDSCH), etc.) etc. associated with network 100). For example, in one embodiment, scheduler 340 may receive information identifying a RRC resource set and a non-RRC resource set from base station 122-1, and may map (or allocate) RRC data (e.g., one or more RRC messages) to one or more resources associated with the RRC resource set.

Communication interface 350 may include, for example, a transmitter that may convert baseband signals from processing unit 300 to radio frequency (RF) signals and/or a receiver that may convert RF signals to baseband signals. Alternatively, communication interface 350 may include a transceiver to perform functions of both a transmitter and a receiver. Communication interface 350 may connect to antenna assembly 360 for transmission and/or reception of the RF signals.

Antenna assembly 360 may include one or more antennas to transmit and/or receive signals through a radio interface. Antenna assembly 360 may, for example, receive RF signals from communication interface 350 and transmit them through the radio interface, and receive RF signals through the radio interface and provide them to communication interface 350. In one embodiment, for example, communication interface 350 may communicate with a network (e.g., network 100) and/or devices connected to a network.

As described herein, user equipment 110-1 may perform certain operations in response to processing unit 300 executing software instructions of an application contained in a computer-readable medium, such as memory 310. The software instructions may be read into memory 310 from another computer-readable medium or from another device via communication interface 350. The software instructions contained in memory 310 may cause processing unit 300 to perform processes described herein. Alternatively, hardwired circuitry may be used in place of or in combination with software instructions to implement processes described herein. Thus, embodiments described herein are not limited to any specific combination of hardware circuitry and software.

Although FIG. 3 shows exemplary components of user equipment 110-1, in other embodiments, user equipment 110-1 may contain fewer, different, or additional components than depicted in FIG. 3. In still other embodiments, one or more components of user equipment 110-1 may perform one or more tasks described as being performed by one or more other components of user equipment 110-1.

FIG. 4A illustrates a diagram of exemplary operation of base station 122-1. Base stations 122-2 through 122-M may operate in a similar manner. As shown in FIG. 4A, base station 122-1 may include scheduler 234, ICIC mechanism 236, and classifier 238. Scheduler 234, ICIC mechanism 236, and classifier 238 may include the features described above in connection with, for example, FIG. 2.

As further shown in FIG. 4A, classifier 238 may receive data 405 (e.g., provided via the RRC protocol) associated with one or more resources (e.g., traffic channels, radio bearers, scheduled shared channels, etc.) of network 100. Data 405 may include information transmitted via the one or more resources, information about the one or more resources, etc. In one exemplary embodiment, data 405 may include RRC data 410 and/or non-RRC data 420. RRC data 410 may include RRC messages transmitted using downlink and uplink traffic channels (TCH) associated with network 100. Non-RRC data 420 may include information (other than RRC messages) transmitted using downlink and uplink traffic channels (TCH) associated with network 100. Classifier 238 may classify data 405 as RRC data 410 or non-RRC data 420, and may provide RRC data 410 and/or non-RRC data 420 to scheduler 234.

ICIC mechanism 236 may receive information 440 associated with one or more resources (e.g., of network 100), and may calculate expected interferences (INT) 450 associated with the one or more resources based on information 440. Information 440 may include intercell interference information associated with the one or more resources. Expected interferences 450 may include intercell interferences expected for the one or more resources. In one embodiment, for example, an expected interference of a particular resource may be functionally related to properties of the particular resource. ICIC mechanism 236 may provide expected interferences 450 to scheduler 234.

Scheduler 234 may receive classified data (e.g., RRC data 410 and/or non-RRC data 420) from classifier 238, and may receive, from ICIC mechanism 236, expected interferences 450. Scheduler 234 may map (or allocate) RRC data 410 to one or more resources 460 with low expected intercell interference, and may map (or allocate) non-RRC data 420 to one or more resources 470 with low and/or a high expected intercell interference.

Although FIG. 4A shows exemplary operations of base station 122-1, in other embodiments, base station 122-1 may perform fewer, different, or additional operations than depicted in FIG. 4A.

In an uplink, classification of data blocks may be performed in user equipment 110 (e.g., via classifier 330), and scheduler 234 (e.g., provided in base station 122-1) may need to be made aware of the classification using some form a signaling. For example, in one embodiment, the signaling may provide the classification of data via a modified buffer status report, a scheduling request format for data classified as a RRC message, etc.

Figure 4B:
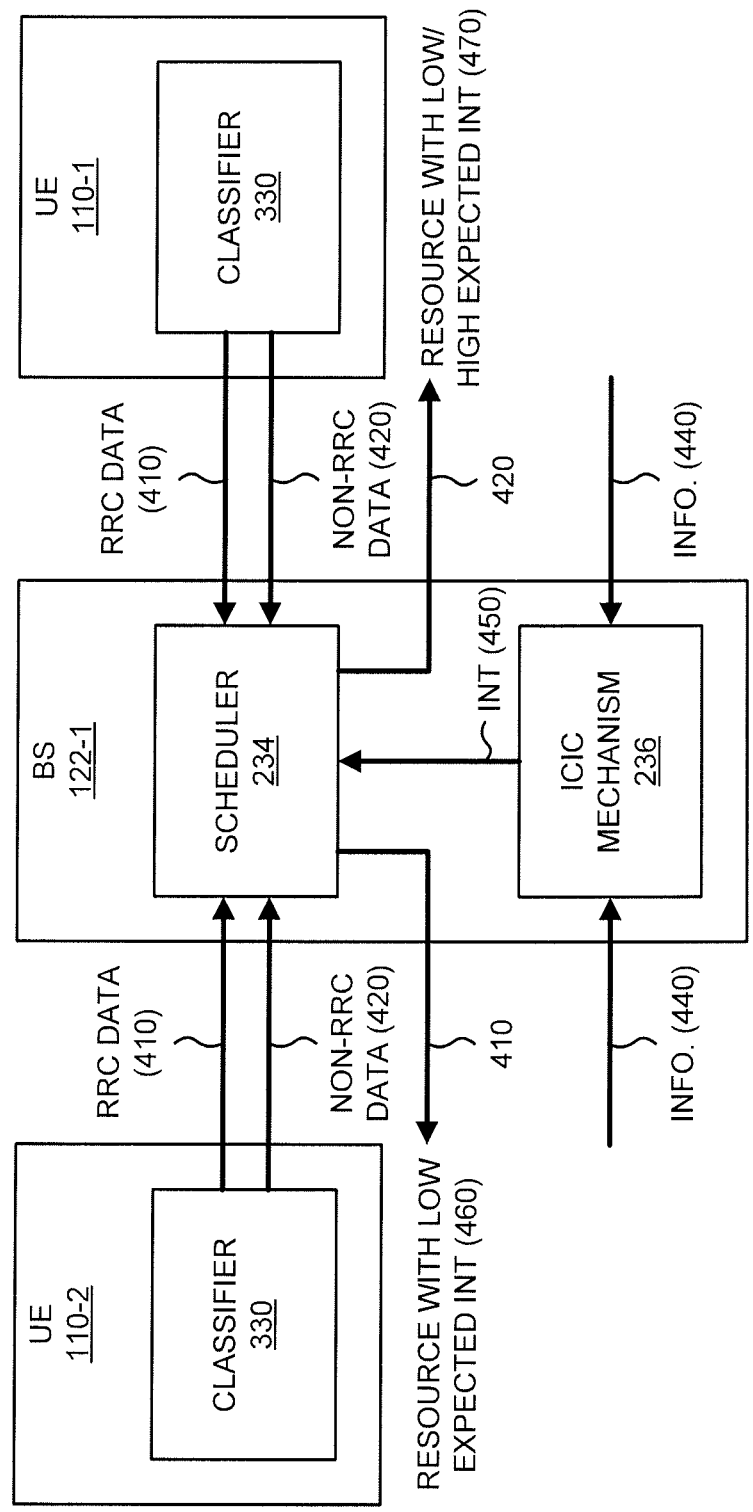
FIG. 4B depicts a diagram of exemplary interactions among the base station and the user equipment illustrated in FIG. 1.

FIG. 4B depicts a diagram of exemplary interactions among base station 122-1 and user equipment 110-1 and 110-2, where the classification of data blocks is performed in user equipment 110-1 and 110-2 (e.g., via classifiers 330). As shown in FIG. 4B, user equipment 110-1 and 110-2 may each include classifier 330, and base station 122-1 may include scheduler 234 and ICIC mechanism 236. Scheduler 234, ICIC mechanism 236, and classifier 330 may include the features described above in connection with, for example, FIGS. 2 and 3.

Each of the classifiers 330 may receive data (not shown, e.g., data 405) associated with one or more resources (e.g., traffic channels, radio bearers, scheduled shared channels, etc.) of network 100. The data may include information transmitted via the one or more resources, information about the one or more resources, etc. In one exemplary embodiment, the data may include RRC data 410 and/or non-RRC data 420. RRC data 410 and non-RRC data 420 may include the features described above in connection with, for example, FIG. 4A. Each of the classifiers 330 may classify the data as RRC data 410 or non-RRC data 420, and may provide RRC data 410 and/or non-RRC data 420 to scheduler 234 of base station 122-2 (e.g., via the signaling described above).

ICIC mechanism 236 of base station 122-1 may receive information 440 associated with one or more resources (e.g., of network 100), and may calculate expected interferences (INT) 450 associated with the one or more resources based on information 440. Information 440 and expected interferences 450 may include the features described above in connection with, for example, FIG. 4A. ICIC mechanism 236 may provide expected interferences 450 to scheduler 234.

Scheduler 234 may receive classified data (e.g., RRC data 410 and/or non-RRC data 420) from classifiers 330, and may receive, from ICIC mechanism 236, expected interferences 450. Scheduler 234 may utilize the received information (e.g., RRC data 410, non-RRC data 420, and/or expected interferences 450) to determine one or more resources 460 with low expected intercell interference and/or one or more resources 470 with low and/or high expected intercell interference. Scheduler 234 may utilize the determined resources (e.g., resource(s) 460 or resource(s) 470) when allocating data (e.g., RRC data 410 or non-RRC data 420) to one or more resources. For example, as shown in FIG. 4B, scheduler 234 may allocate RRC data 410 to one or more resources 460 with low expected intercell interference, and may allocate non-RRC data 420 to one or more resources 470 with low and/or high expected intercell interference.

Although FIG. 4B shows exemplary interactions between base station 122-1 and user equipment 110-1 and 110-2, in other embodiments, base station 122-1 and user equipment 110-1 and 110-2 may perform fewer, different, or additional interactions than depicted in FIG. 4B.

In an alternative embodiment, as shown in FIG. 5, schedulers 340 may be included in user equipment 110-1 and 110-2 in addition to scheduler 234 included in base station 122-2. As further shown in FIG. 5, user equipment 110-1 and 110-2 may each include classifier 330, and base station 122-1 may include ICIC mechanism 236. Scheduler 234, ICIC mechanism 236, classifier 330, and scheduler 340 may include the features described above in connection with, for example, FIGS. 2 and 3.

Each of classifiers 330 may receive data (not shown, e.g., data 405) associated with one or more resources (e.g., traffic channels, radio bearers, scheduled shared channels, etc.) of network 100. The data may include information transmitted via the one or more resources, information about the one or more resources, etc. In one exemplary embodiment, the data may include RRC data 410 and/or non-RRC data 420. RRC data 410 and non-RRC data 420 may include the features described above in connection with, for example, FIG. 4A. Each of classifiers 330 may classify the data as RRC data 410 or non-RRC data 420, and may provide RRC data 410 and/or non-RRC data 420 to scheduler 234 of base station 122-1 (e.g., via the signaling described above).

ICIC mechanism 236 of base station 122-1 may receive information 440 associated with one or more resources (e.g., of network 100), and may calculate expected interferences (INT) 450 associated with the one or more resources based on information 440. Information 440 and expected interferences 450 may include the features described above in connection with, for example, FIG. 4A. ICIC mechanism 236 may provide expected interferences 450 to scheduler 234.

Scheduler 234 may receive classified data (e.g., RRC data 410 and/or non-RRC data 420) from classifiers 330, and may receive, from ICIC mechanism 236, expected interferences 450. Scheduler 234 may utilize the received information (e.g., RRC data 410, non-RRC data 420, and/or expected interferences 450) to determine sets of resources 510 associated with network 100. For example, scheduler 234 may utilize the received information to determine a RRC resource set (e.g., a set of resources of network 100 with low intercell interference) and a non-RRC resource set (e.g., a set of resources of network 100 with low and/or high intercell interference). Scheduler 234 may allocate sets of resources 510 to user equipment 110-1 and 110-2 (e.g., to schedulers 340). User equipment 110-1 and 110-2 (e.g., schedulers 340) may receive information identifying sets of resources 510 (e.g., the RRC resource set and the non-RRC resource set), and may map (or allocate) RRC data 520 to one or more resources associated with the RRC resource set.

Although FIG. 5 shows exemplary interactions between base station 122-1 and user equipment 110-1 and 110-2, in other embodiments, base station 122-1 and user equipment 110-1 and 110-2 may perform fewer, different, or additional interactions than depicted in FIG. 5.

Figure 6:
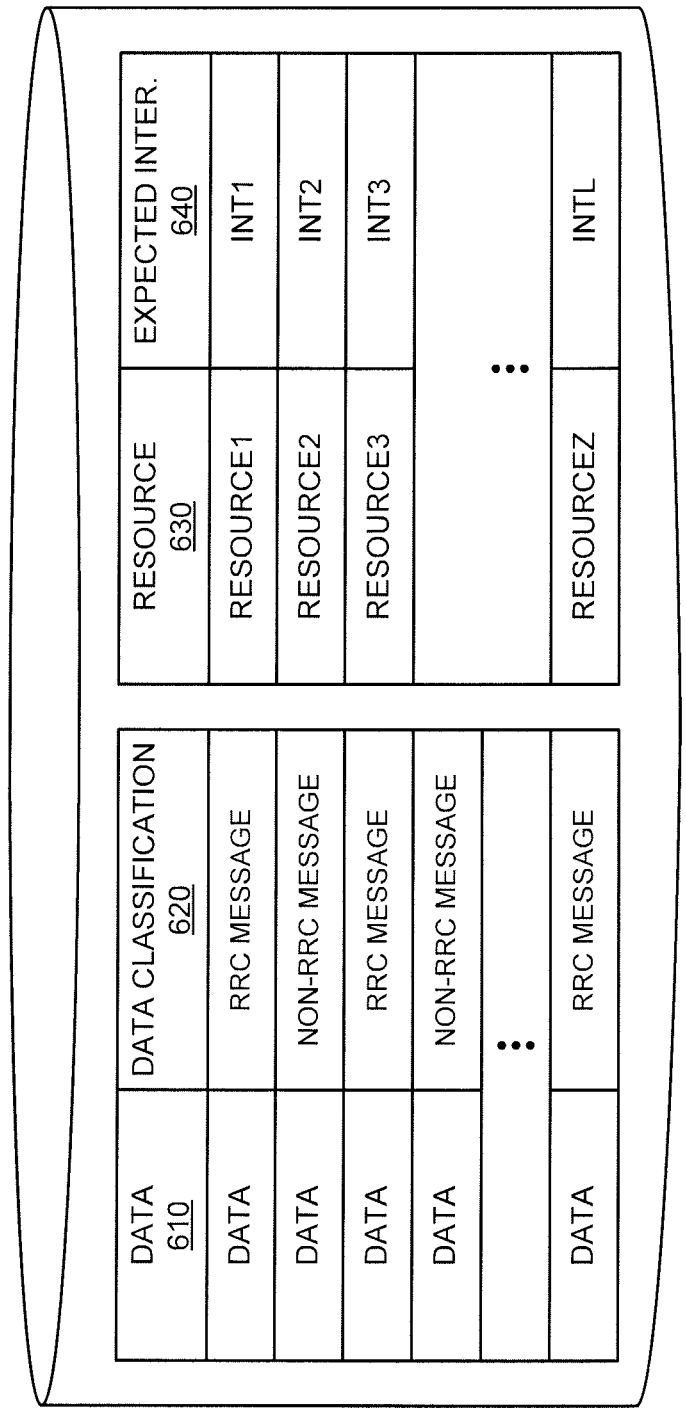
FIG. 6 depicts an exemplary diagram of a computer-readable medium that may be associated with the base station illustrated in FIG. 1.

FIG. 6 is an exemplary diagram of a computer-readable medium 600 that may be associated with a base station, such as base station 122-1. While one computer-readable medium is described below, computer-readable medium 300 may include multiple computer-readable media stored locally at base station 122-1, or stored at one or more different and possibly remote locations.

As illustrated, computer-readable medium 600 may maintain a group of entries in the following exemplary fields: a data field 610, a data classification field 620, a resource field 630, and an expected interference field 640. Computer-readable medium 600 may maintain additional or different information than that illustrated in FIG. 6. Data classification field 620 may be directly set by the base station and/or user equipment where the RRC protocol is originated. Data classification field 620 may be set by an autonomous entity by reading a header of a data packet.

Data field 610 may store data (e.g., data 405) associated with one or more resources (e.g., traffic channels, radio bearers, a scheduled shared channels, etc.) of network 100. In one embodiment, the data provided in data field 610 may include information transmitted via the one or more resources, information about the one or more resources, etc.

Data classification field 620 may store classifications (e.g., RRC data 410 and/or non-RRC data 420) of the data provided in data field 610. In one embodiment, data classification field 620 may include data classified as a RRC message and/or a non-RRC message. Data may be classified by user equipment 110, base station 122, and/or RNC 124 (e.g., as exemplified by FIG. 8) as a RRC message if the data includes a RRC message transmitted using downlink and uplink traffic channels (TCH) associated with network 100. Data may be classified as a non-RRC message if the data includes information (other than RRC messages) transmitted using downlink and uplink traffic channels (TCH) associated with network 100.

Resource field 630 may store information (e.g., information 440) associated with and/or identifying one or more resources (e.g., a traffic channel, a radio bearer, scheduled shared channels, etc.)etc. associated with network 100). In one embodiment, resource field 630 may include capacity information, bandwidth information, intercell information, intercell interference information, identification information, etc. associated with one or more resources.

Expected interference field 640 may store intercell interferences (e.g., expected interferences 450) expected for the one or more resources associated with network 100. In one embodiment, expected interference field 640 may store an expected intercell interference of a particular resource (e.g., a resource provided in resource field 630) based on properties of the particular resource.

Figure 7:
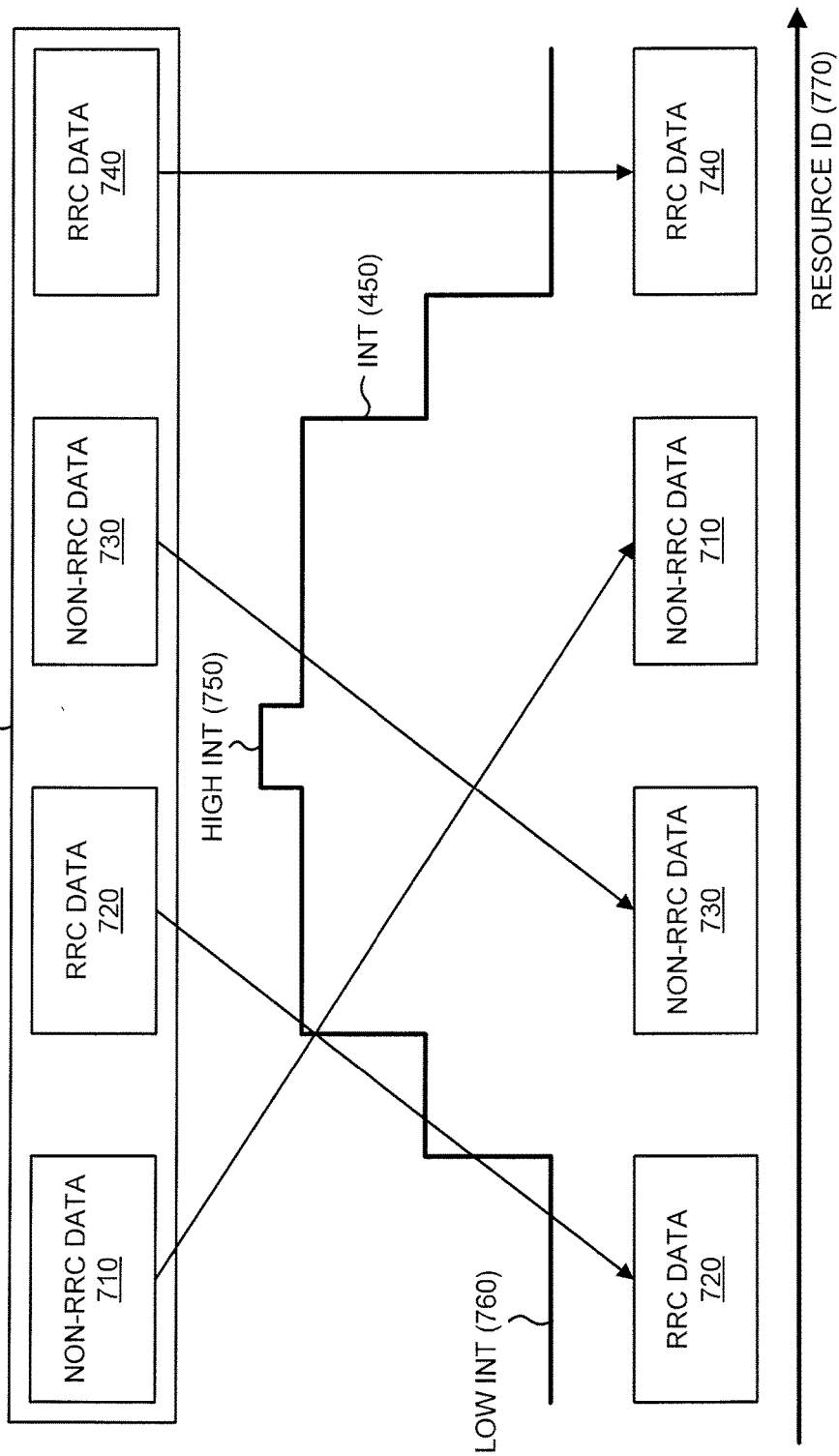
FIG. 7 illustrates a diagram of an exemplary allocation of Radio Resource Control (RRC) data and non-RRC data according to embodiments described herein.

FIG. 7 illustrates a diagram of an exemplary allocation 700 of Radio Resource Control (RRC) data and non-RRC data according to embodiments described herein. As shown, scheduler 234 may include non-RRC data 710, RRC data 720, non-RRC data 730, and RRC data 740. Scheduler 234 may include the features described above in connection with, for example, FIG. 2. Non-RRC data 710 and 730 may include information (other than RRC messages) transmitted using downlink and uplink traffic channels (TCH) associated with network 100. RRC data 720 and 740 may include RRC messages transmitted using downlink and uplink traffic channels (TCH) associated with network 100.

As further shown in FIG. 7, expected interferences 450 associated with one or more resources may be available to scheduler 234 and may be displayed as a plot diagram. Expected interferences 450 plot diagram may include one or more resources with high expected intercell interferences 750, and one or more resources with low expected intercell interferences 760. The one or more resources associated with expected interferences 450 plot diagram may be identified based on a resource identification 770. For example, one or more resources identified by resource identification 770 may be associated with high expected intercell interferences 750, and one or more resources identified by resource identification 770 may be associated with low expected intercell interferences 760.

Scheduler 234 may allocate non-RRC data 710, RRC data 720, non-RRC data 730, and RRC data 740 to one or more resources according to embodiments described herein (e.g., according the embodiments described above in connection with, for example, FIG. 4A). In one exemplary embodiment, as shown in FIG. 7, scheduler 234 may allocate non-RRC data 710 and 730 to resources with high expected intercell interferences 750, and may allocate RRC data 710 and 740 to resources with low expected intercell interferences 760. Such an arrangement may ensure that RRC messages are allocated to resources with low expected intercell interferences, and may provide improved robustness for RRC messages. More robust RRC messages may provide more robust control signaling, which may lead to more robust handovers, connection set-ups, etc.

Figure 8:
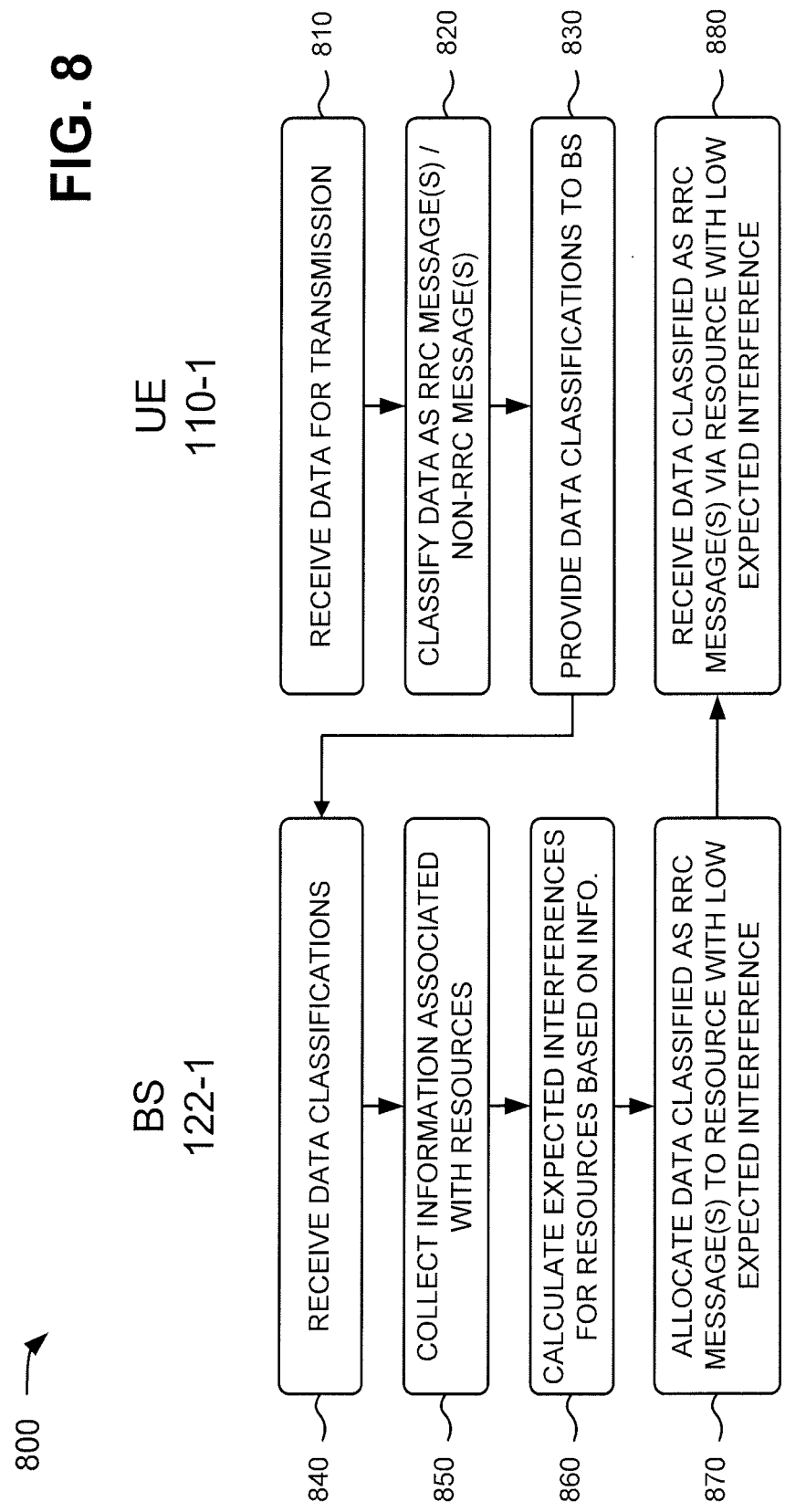
Figure 9:
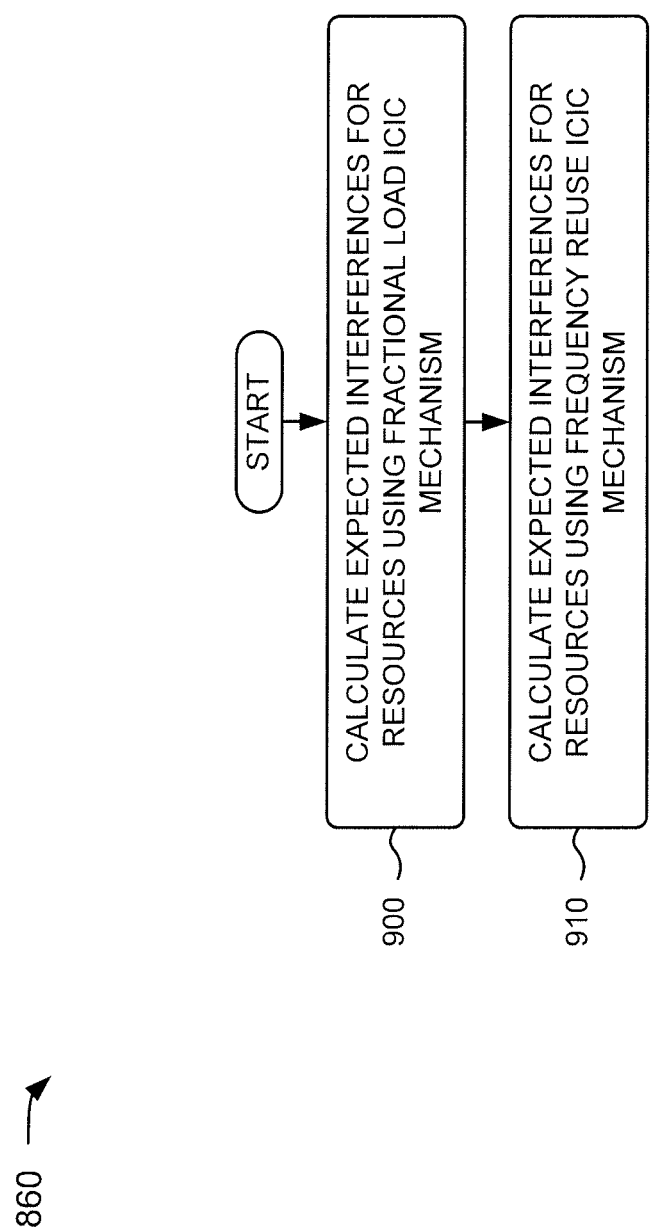

FIGS. 8-10 depict flow charts of an exemplary process 800 for applying intercell interference coordination (ICIC) mechanisms to Radio Resource Control (RRC) messages according to embodiments described herein. In one embodiment, process 800 may be performed by hardware and/or software components of user equipment 110 and/or base station 122. In other embodiments, process 800 may be performed by hardware and/or software components of user equipment 110 and/or base station 122 in combination with hardware and/or software components of another device or group of devices (e.g., communicating with user equipment 110 and/or base station 122).

As illustrated in FIG. 8, process 800 may begin with receipt of data for transmission by user equipment 110-1 (block 810), and classification of the data as one or more RRC messages and/or one or more non-RRC messages (block 820). For example, in embodiments described above in connection with FIG. 4B, classifier 330 of user equipment 110-1 may receive data (e.g., data 405) associated with one or more resources (e.g., traffic channels, radio bearers, etc.) of network 100. The data may include information transmitted via the one or more resources, information about the one or more resources, etc. In one example, the data may include RRC data 410 and/or non-RRC data 420. Classifier 330 may classify the data as RRC data 410 (e.g., if the data is provided via the RRC protocol) or non-RRC data 420 (e.g., if the data is not provided via the RRC protocol).

Returning to FIG. 8, user equipment 110-1 may provide the data classifications to base station 122-1 (block 830), and base station 122-1 may receive the data classifications (block 840). For example, in embodiments described above in connection with FIG. 4B, classifier 330 of user equipment 110-1 may provide RRC data 410 and/or non-RRC data 420 to scheduler 234 of base station 122-2. Scheduler 234 may receive classified data (e.g., RRC data 410 and/or non-RRC data 420) from classifier 330.

As further shown in FIG. 8, base station 122-1 may collect information associated with resources (block 850), and may calculate expected intercell interferences for the resources based on the collected information (block 860). For example, in embodiments described above in connection with FIG. 4B, ICIC mechanism 236 of base station 122-1 may receive information 440 associated with one or more resources (e.g., of network 100), and may calculate expected interferences (INT) 450 associated with the one or more resources based on information 440. Information 440 may include intercell interference information associated with the one or more resources. Expected interferences 450 may include intercell interferences expected for the one or more resources. In one example, an expected intercell interference of a particular resource may be functionally related to properties of the particular resource.

Returning to FIG. 8, base station 122-1 may allocate data classified as RRC message(s) to a resource with low expected intercell interference (block 870), and user equipment 110-1 may receive data classified as RRC message(s) via the resource with low expected intercell interference (block 880). For example, in embodiments described above in connection with FIG. 4B, scheduler 234 of base station 122-1 may utilize the received information (e.g., RRC data 410, non-RRC data 420, and/or expected interferences 450) to determine one or more resources 460 with low expected intercell interference and/or one or more resources 470 with low and/or high expected intercell interference. Scheduler 234 may utilize the determined resources (e.g., resource(s) 460 or resource(s) 470) when allocating data (e.g., RRC data 410 or non-RRC data 420) to one or more resources. In one example, scheduler 234 may allocate RRC data 410 to one or more resources 460 with low expected intercell interference, and may allocate non-RRC data 420 to one or more resources 470 with low and/or high expected intercell interference. In another example, user equipment 110-1 may receive RRC data 410 from one or more resources 460 with low expected intercell interference.

Process block 860 may include the process blocks depicted in FIG. 9. As shown in FIG. 9, process block 860 may include one of calculating the expected intercell interferences for the resources using a fractional load ICIC mechanism (block 900), or calculating the expected intercell interferences for the resources using a frequency reuse ICIC mechanism (block 910). For example, in embodiments described above in connection with FIG. 2, ICIC mechanism 236 of base station 122-1 may receive information associated with one or more resources (e.g., of network 100), and may calculate expected intercell interference information associated with the one or more resources. ICIC mechanism 236 may include a variety of intercell interference coordination mechanisms (e.g., a fractional load ICIC mechanism, a frequency reuse ICIC mechanism, etc.) for calculating expected intercell interference information associated with the one or more resources.

Process blocks 870/880 may include the process blocks depicted in FIG. 10. As shown in FIG. 10, process blocks 870/880 may include allocating, via base station 122-1, a RRC resource set and a non-RRC resource set to user equipment 110-1 (block 1000), receiving, via user equipment 110-1, information identifying the RRC resource set and the non-RRC resource set (block 1010), and mapping, via user equipment 110-1, one or more RRC messages to one or more resources associated with the RRC resource set (block 1020). For example, in embodiments described above in connection with FIG. 5, scheduler 234 of base station 122-1 may utilize the received information (e.g., RRC data 410, non-RRC data 420, and/or expected interferences 450) to determine sets of resources 510 associated with network 100. In one example, scheduler 234 may utilize the received information to determine a RRC resource set (e.g., a set of resources of network 100 with low intercell interference) and a non-RRC resource set (e.g., a set of resources of network 100 with low and/or high intercell interference). Scheduler 234 may allocate sets of resources 510 to user equipment 110-1. User equipment 110-1 may receive information identifying sets of resources 510, and may map (or allocate) RRC data 520 to one or more resources associated with the RRC resource set.

Embodiments described herein may apply intercell interference coordination (ICIC) mechanisms to Radio Resource Control (RRC) messages in a system where RRC messages and user data are carried by the same traffic channels (TCHs). In one embodiment, for example, user equipment (UE) may receive data for transmission, may classify the data as a RRC message or a non-RRC message, and may provide the data classification to a base station (BS). The base station may receive the data classification, may collect information associated with resources, and may calculate expected intercell interferences for the resources based on the collected information. The base station may allocate data classified as a RRC message to a resource with a low expected intercell interference. The user equipment may receive the data classified as a RRC message via the resource with the low expected intercell interference.

Such an arrangement may ensure that RRC messages are allocated to resources with low expected intercell interferences, and may provide improved robustness for RRC messages. More robust RRC messages may provide more robust control signaling, which may lead to more robust handovers, connection set-ups, etc.

Embodiments described herein may apply intercell interference coordination (ICIC) mechanisms to Radio Resource Control (RRC) messages and other control messages scheduled and sent on a shared channel together with data.

Embodiments described herein provide illustration and description, but are not intended to be exhaustive or to limit the implementations to the precise form disclosed. Modifications and variations are possible in light of the above teachings, or may be acquired from practice of the implementations. For example, while series of blocks have been described with regard to FIGS. 8-10, the order of the blocks may be modified in other embodiments. Further, non-dependent blocks may be performed in parallel.

The exemplary embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the exemplary embodiments were described without reference to the specific software code—it being understood that one would be able to design software and control hardware to implement the exemplary embodiments based on the description herein.

Further, certain portions of the invention may be implemented as "logic" that performs one or more functions. This logic may include hardware, such as an application specific integrated circuit, a field programmable gate array, a processor, or a microprocessor, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the terms "comprises/comprising" when used in the this specification are taken to specify the presence of stated features, integers, steps, or components, but do not preclude the presence or addition of one or more other features, integers, steps, components, or groups thereof No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a base station in a wireless communication system that includes a plurality of cells, the method comprising:
    calculating expected levels of inter-cell interference associated with two or more different resources in a cell available for wireless communication of both control messages and user data, wherein the calculating comprises one or both of:
    calculating the expected levels of inter-cell interference using a fractional load Inter-cell Interference Coordination (ICICI mechanism; and
    calculating the expected levels of inter-cell interference using a frequency reuse ICIC mechanism;
    determining that one of the resources in the cell is associated with a level of expected inter-cell interference having a value less than a value of an expected inter-cell interference associated with another of the two or more different resources;
    allocating data classified as a control message to the determined resource for communication of that data in said cell; and
    transmitting or receiving said data on the determined resource.

2. The method of claim 1, wherein the control message comprises a Radio Resource Control (RRC) message.

3. The method of claim 1, wherein said resources comprise scheduled shared channels.

4. The method of claim 1, further comprising:
    classifying said data as one of an RRC message or a non-RRC message:
    collecting information associated with said resources; and
    calculating the expected levels of inter-cell interference associated with the resources based on said information.

5. The method of claim 1, wherein said resources comprise traffic channels.

6. The method of claim 1, wherein the control message comprises a Radio Resource Control (RRC) message, and wherein said allocating comprises allocating an RRC resource set and a non-RRC resource set to a user equipment for data transmission in said cell, said RRC resource set including the determined resource.

7. The method of claim 1, wherein the control message comprises a Radio Resource Control (RRC) message, and wherein said allocating comprises mapping said data to one or more resources included in an RRC resource set, said RRC resource set including said determined resource.

8. The method of claim 1 wherein the identified resource is associated with a level of expected inter-cell interference that is lower than a desired threshold.

9. A base station comprising:
    an Inter-cell Interference Coordination (ICIC) mechanism configured to:
    collect information associated with two or more different resources in a cell available for wireless communication of both control messages and user data,
    calculate expected levels of inter-cell interference associated with the different resources, based on the collected information, by using one or both of a fractional load ICIC mechanism and a frequency reuse ICIC mechanism, and determine that one of the resources is associated with a level of expected inter-cell interference having a value less than a value of an expected inter-cell interference associated with another of the two or more different resources; and a scheduler circuit configured to:

receive a classification of data describing data as being one of a control message or a non-control message, and allocate data classified as a control message to the determined resource for communication of that data in said cell.

10. The base station of claim 9, further comprising a classifier circuit configured to generate said classification to describe data as being one of a Radio Resource Control (RRC) message or a non-RRC message.

11. The base station of claim 9, wherein the scheduler circuit is configured to allocate an RRC resource set and a non-RRC resource set to a user equipment for communication in said cell, the RRC resource set including the determined resource.

12. The base station of claim 9, wherein the scheduler circuit is configured to map data classified as a RRC message to one or more resources included in an RRC resource set, said RRC resource set including said determined resource.

13. The base station of claim 9, wherein said resources comprises traffic channels.

14. The base station of claim 9, wherein data classified as an RRC message handles control plane signaling of a Layer 3 associated with the base station.

* * * * *